United States Patent
Chang

(10) Patent No.: US 6,909,934 B1
(45) Date of Patent: Jun. 21, 2005

(54) EFFICIENT METHOD OF DYNAMIC FORMULATION OF CHAMBER SELECTIONS FOR MULTIPLE CHAMBER TOOLS

(75) Inventor: Sean Chang, Taichung (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 10/751,796

(22) Filed: Jan. 5, 2004

(51) Int. Cl.⁷ .............................................. G06F 19/00
(52) U.S. Cl. ..................... 700/121; 700/95; 700/117; 438/5
(58) Field of Search .......................... 700/95, 100, 117, 700/121; 257/E21.525; 505/300; 438/5

(56) References Cited

U.S. PATENT DOCUMENTS

| 5,867,389 A | 2/1999 | Hamada et al. |
| 6,256,550 B1 | 7/2001 | Wu et al. |
| 6,334,215 B1 | 12/2001 | Barker et al. |
| 6,413,583 B1 * | 7/2002 | Moghadam et al. ... 427/249.15 |
| 2004/0147109 A1 * | 7/2004 | Yau et al. ................ 438/623 |
| 2004/0185583 A1 * | 9/2004 | Tomoyasu et al. ........... 438/8 |
| 2004/0200574 A1 * | 10/2004 | Davis et al. ............. 156/345.1 |
| 2005/0010319 A1 * | 1/2005 | Patel et al. ................. 700/121 |

* cited by examiner

*Primary Examiner*—Jayprakash N. Gandhi
(74) *Attorney, Agent, or Firm*—Haynes and Boone, LLP

(57) ABSTRACT

A new method to manufacture a product is achieved. The method comprises providing a control system and a process tool. The process tool comprises multiple chambers. The process tool stores a plurality of recipes. The control system comprises a database. A set of chambers and a recipe name are selected based on the database. A recipe body is uploaded from the process tool to the control system based on the recipe name. The recipe body is modified to generate a runtime recipe body that specifies the set of chambers. The runtime recipe body is downloaded from the control system to the process tool. A product is processed in the process tool using the runtime recipe body.

25 Claims, 5 Drawing Sheets

| STEP | RM | RV | EQS | SECS | TOOL |
|---|---|---|---|---|---|
| 1 | | → | Check Ask Load<br>1. Get Automatic Recipe<br>2. Get Chamber Status | | |
| 2 | | | | → | S7F65 (Upload Current PPID) |
| 3 | | | Check PPID Exist? | ← | S57F66 |
| 4 | | | If PPID Exist, Then | → | S7F5 ( Upload PP Body) |
| 5 | | | Check Uploaded Sequence Name<br>Modify SEQ Body<br>1. Check Single Chamber<br>2. Modify Byte 35<br>3. Modify Chamber Mask<br>Modify SEQ Name | ← | S7F6 |
| 6 | | | | → | S7F67 ( Delete PPID) |
| 7 | | | If Success, Then | ← | S7F68 |
| 8 | | | | → | S7F1 ( PP Download Inquire) |
| 9 | | | If Success, Then | ← | S7F2 |
| 10 | | | | → | S7F3 ( PP Download) |
| 11 | | | If Success, Then | ← | S7F4 |
| 12 | | | | → | S7F11 ( MID/PPID Update) |
| 13 | | | | ← | S7F12 |
| 14 | | ← | Ack Check Ask Load | | |
| | | | ⋮ ( Run Product) | | |
| 15 | | → | Check End Upload | | |
| 16 | | | | → | S7F67 ( Delete PPID) |
| 17 | | | | ← | S7F68 |
| 18 | | ← | Ack Check End Unload | | |

FIG. 5           300

EFFICIENT METHOD OF DYNAMIC FORMULATION OF CHAMBER SELECTIONS FOR MULTIPLE CHAMBER TOOLS

BACKGROUND OF THE INVENTION (1) Field of the Invention

The invention relates to a method to manufacture a product, and, more particularly, to a method to formulate chamber selections for multiple chamber tools in the manufacture of an integrated circuit device.

(2) Description of the Prior Art

Integrated circuit manufacturing presents many unique challenges. The typical process cycle takes many days, or weeks, and requires a large number of complex steps. Much of the processing is performed in batches, or lots, or wafers. These lots must be tracked throughout the process cycle to ensure that the proper processing sequence has been performed.

Referring now to FIG. 1, the architecture for an exemplary manufacturing line is shown. The manufacturing process can be divided into two general classes, the manufacturing control system 10 and the manufacturing equipment 20. The manufacturing equipment 20 comprises a collection of processing tools 40, 44, and 48, that are used during the processing sequence for manufacturing the integrated circuit wafers. At particular steps in the process flows, one lot or several lots of wafers are loaded into process tools. A process step, such as etching, thermal processing, deposition, or ion implantation, is then performed on the wafers in the tool.

Each process tool 40, 44, and 48, comprises a control unit and a process chamber. TOOL003 48 comprises a single process chamber. TOOL001 40 and TOOL002 44 are multiple chamber tools. For example, TOOL001 40 comprises two processing chambers, labeled A and B. TOOL002 44 comprises four processing chambers, labeled A, B, C, and D. The multiple chamber tools 40 and 44 may be configured so that the chambers run independently. That is, one chamber may run a first processing variation, or recipe, while another chamber runs a second recipe. The presence of independent, multiple chambers makes the multiple chamber tools 40 and 44 very useful for the manufacturer. Typically, such tools require less floor space and utilities than an equivalent number of chambers in single chamber tools 48.

The manufacturing process is managed by the manufacturing control system 10. With the advent of high speed computers and highly developed software, much of the decision making on the manufacturing floor is now under the control of the computer system. The exemplary system 10 comprises a manufacturing execution system (MES) running on a server 24. For example, PROMIS™ software is frequently used for the MES role. The PROMIS™ server 24 comprises a database 33 that tracks every product lot in the manufacturing facility. The processing history and current status of each lot is stored along with the routing flow for the product. The PROMIS™ server 24 also performs a role in selecting recipes to be run on the processing tools 40, 44, and 48.

A CONSTRAINT MANAGER (CSN™) server 28 is used to track equipment resources in the manufacturing facility. The CSN™ server 28 selects the most appropriate processing tool for the next step in the processing flow for a particular lot to maximize line throughput and to minimize cycle time. Further, the CSN™ server 28 can perform chamber selection within a tool. The RUN MANAGER (RM™) server 32 is used to manage the actual process runs in the plant. The RM™ server 32 performs error prevention routines and maintains a process run database 33.

The EQUIPMENT SERVER (EQS™) 36 performs direct management of the processing tools 40, 44, and 48. The EQS™ 36 provides a tool communication link using a semiconductor equipment communication standard (SECS) protocol. Processing tools can be directly monitored and controlled using the communication links between the tools and the EQS™ 36.

Referring now to FIG. 2, the exemplary manufacturing system is shown specifically for the case of product running on TOOL002 44. In this case, a product lot is moved into an operation step in the PROMIS™ server 24. By referencing the product routing, the PROMIS™ server 24 determines that the next operation requires a manufacturing process having a recipe name "22LM11". The PROMIS™ server 24 information is shared with the CSN™ server 28 via the RM™ server 32. The CSN™ server 28 references the current status of the manufacturing equipment while searching for a tool capable of running the required recipe. The CSN™ server 28 makes an equipment selection. In addition, the CSN™ server 28 selects a chamber, or a set of chambers, on the tool for running this process step. In this example, the selected tool is TOOL002 44. Further, the CSN™ server 28 selects a set of chambers, chambers B and C, to run the process. This selection is passed to the RM™ server 32.

The RM™ server 32 receives the tool selection, recipe name, and chamber selection information from the PROMIS™ server 24 and the CSN™ server 28. The RM™ server 32 now generates a recipe name based on these selections. The generated recipe name is a concatenation of the generic recipe "22LM11" and the specific run chambers, "BC" to form a specific recipe name "22LM11BC." The recipe name is used to select a recipe in the tool 44 using the SECS interface of the EQS™ 36. This recipe may be verified in the RM™ server 32 by uploading the recipe contents from the process tool 44 to the RM™ server 32 and then checking the recipe contents against the RM™ server 32 run database. The EQS™ 36 then commands the tool 44 to start the process when the product wafers have been loaded.

The reason a modified recipe name must be used is illustrated by the process tool 44. The tool 44 contains a recipe manager 52. The recipe manager 52 allows a process engineer to create and to edit recipes for the tool 44. Each recipe contains the steps, the parametric settings, and the run times for a particular process variation. Typically, the recipe manager 52 is accessed through an operator interface that is built into, or attached to, the tool 44. The recipe manager 52 stores all of the recipes for the tool 44. To process wafers in a particular chamber of the tool 44, the recipe must contain the chamber name in specific reference locations in the recipe sequence. Alternatively, if multiple chambers are to be used to process wafers simultaneously, then each chamber must be specified in the recipe sequence.

In this control scenario, therefore, the "22LM11" recipe must be stored in the recipe manager 52 of the tool 44 as a large set of recipes as shown. For example, a recipe named "22LM11A" is used when product is run using the "22LM11" sequence in chamber A, but this recipe is not used for chambers B, C, or D. Alternatively, recipe "22LM11ACD" is used to run recipe sequence "22LM11" in chambers A, C, and D, but not B. Each of the "22LM11-xxxx" variations differs from the other only in regards to the chamber references in the recipe sequence.

The above-described architecture and method results in several disadvantages. First, the large number of combinations of chambers in a multiple chamber machine 44 results in a proliferation of recipes in the recipe manager 52 of that machine 44. In the example case, 15 recipes are required to cover the chamber variations for a single recipe "22LM11". Each major recipe on the tool 44 may generate this magnitude of proliferation. This proliferation of recipes results in poor usage of the available recipe manager storage media. Further, any processing change in the recipe must be made in every one of the fifteen recipes on an individual basis. Therefore, a simple change in the recipe requires a large amount of work by the process engineer. It is very easy for the process engineer to incorrectly change or to neglect to change a single recipe variation. This can result in a significant incorrect processing event if the mistake is not caught. An improved method for handling recipe selection on multiple chamber, process tools is needed.

Several prior art inventions relate to manufacturing management systems. U.S. Pat. No. 6,334,215 B1 to Barker et al shows an application migration method involving a manufacturing execution system (MES). U.S. Pat. No. 6,256,550 B1 to Wu et al discloses a manufacturing control and reporting system capable of tracking overall equipment effectiveness. U.S. Pat. No. 5,867,389 to Hamada et al teaches an apparatus to manage recipes in a wafer production line. The apparatus provides the ability to upload/download recipes, to edit recipes, and to copy recipes.

SUMMARY OF THE INVENTION

A principal object of the present invention is to provide an effective and very manufacturable method to manufacture a product.

A further object of the present invention is to provide a method to dynamically formulate processing recipes for multiple chamber process tools.

A yet further object of the present invention is to eliminate recipe proliferation by dynamically modifying recipes to include chamber selection information.

A yet further object of the present invention is to eliminate errors caused by recipe proliferation.

A yet further object of the present invention is to reduce process engineering workload due to recipe proliferation.

Another further object of the present invention is to provide an apparatus to manufacture a product where recipe proliferation is eliminated by dynamically modifying recipe sequences to include chamber selection.

In accordance with the objects of this invention, a method to manufacture a product is achieved. The method comprises providing a control system and a process tool. The process tool comprises multiple chambers. The process tool stores a plurality of recipes. The control system comprises a database. A set of chambers and a recipe name are selected based on the database. A recipe body is uploaded from the process tool to the control system based on the recipe name. The recipe body is modified to generate a runtime recipe body that specifies the set of chambers. The runtime recipe body is downloaded from the control system to the process tool. A product is processed in the process tool using the runtime recipe body.

Also in accordance with the objects of this invention, an apparatus to manufacture a product is achieved. The apparatus comprises a process tool and a control system. The process tool comprises multiple chambers. The process tool stores a plurality of recipes. The control system comprises a database. The control system governs several tasks, comprising, first, selecting a set of chambers and a recipe name based on a database stored in the control system. A recipe body may be uploaded from the process tool to the control system based on the recipe name. The recipe body may be modified to generate a runtime recipe body that specifies the set of chambers. The runtime recipe body may be downloaded from the control system to the process tool. A product may be processed in the process tool using the runtime recipe body.

BRIEF DESCRIPTION OF THE DRAWINGS

In the accompanying drawings forming a material part of this description, there is shown:

FIG. 5 illustrates an information flow and control diagram showing the second preferred embodiment of the present invention.

DESCRIPTION OF THE PREFERRED EMBODIMENTS

The preferred embodiments of the present invention disclose a method to manufacture a product. The method teaches dynamically modifying process recipes to include chamber selections of multiple chamber process tools. Preferred embodiments are disclosed for an integrated circuit manufacturing control system. It should be clear to those experienced in the art that the present invention can be applied and extended without deviating from the scope of the present invention.

Figure 1:
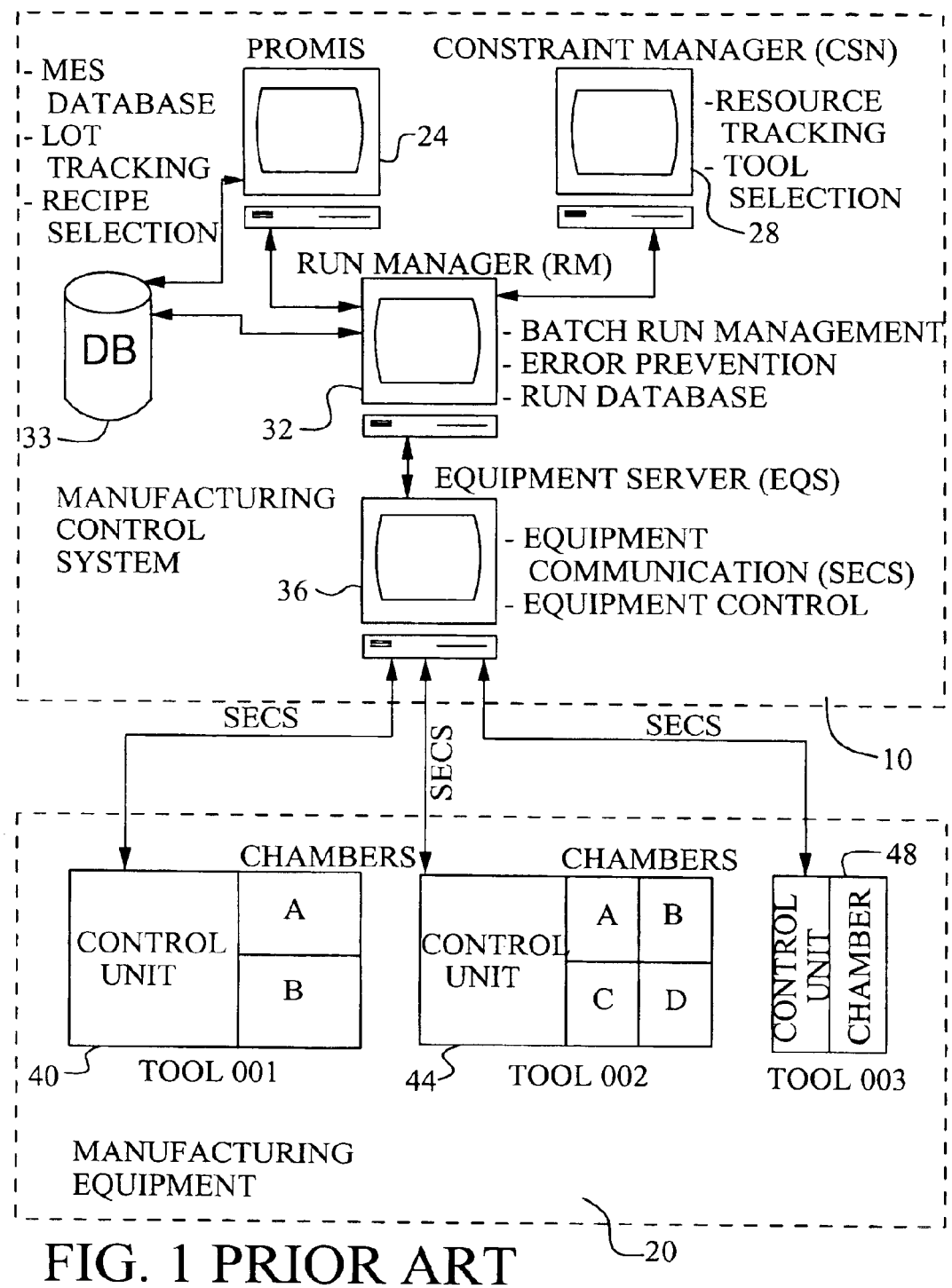
FIG. 1 illustrates a prior art architecture for management of a manufacturing facility.
Figure 2:
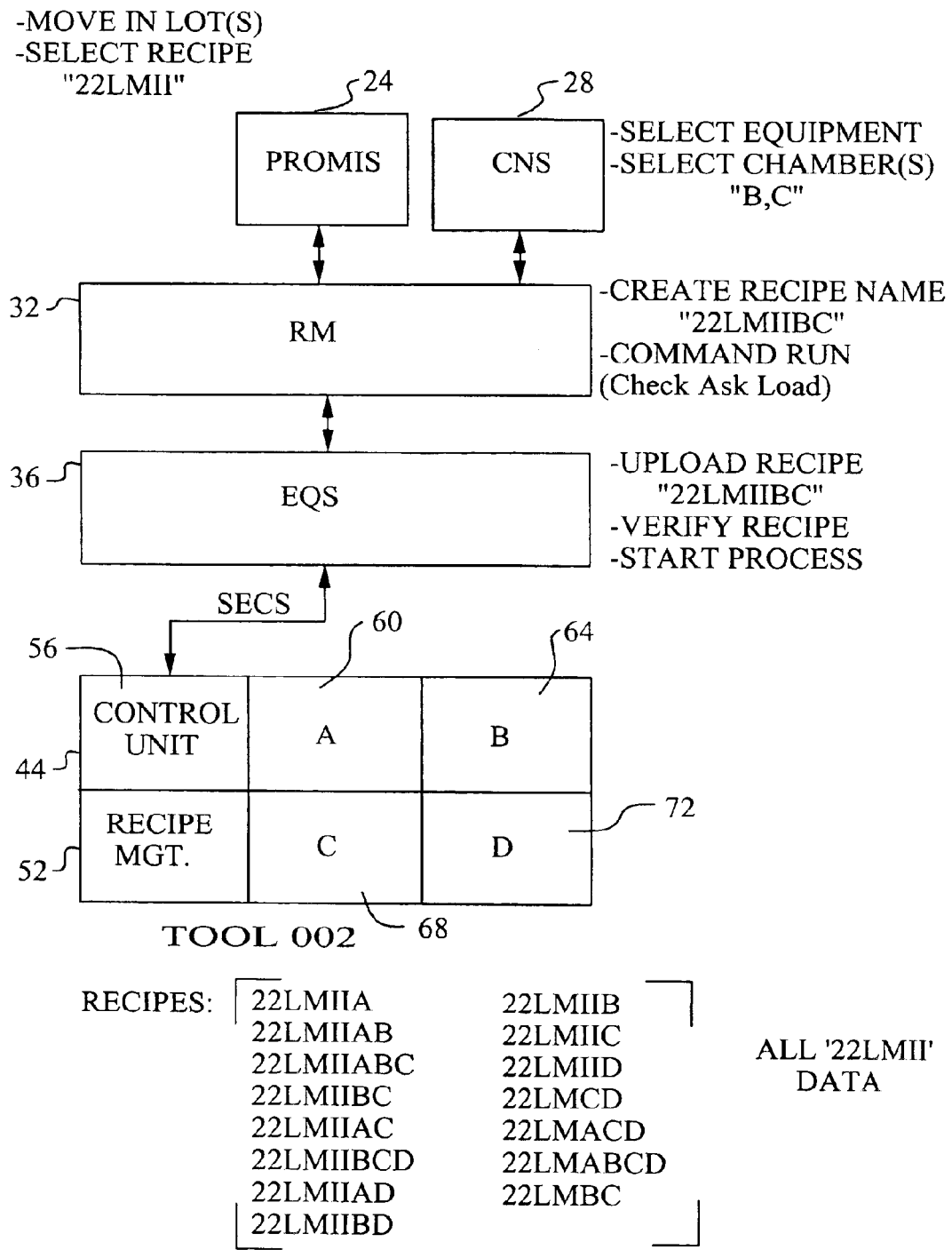
FIG. 2 illustrates a prior art method to select recipes in a process tool in a manufacturing environment.
Figure 3:
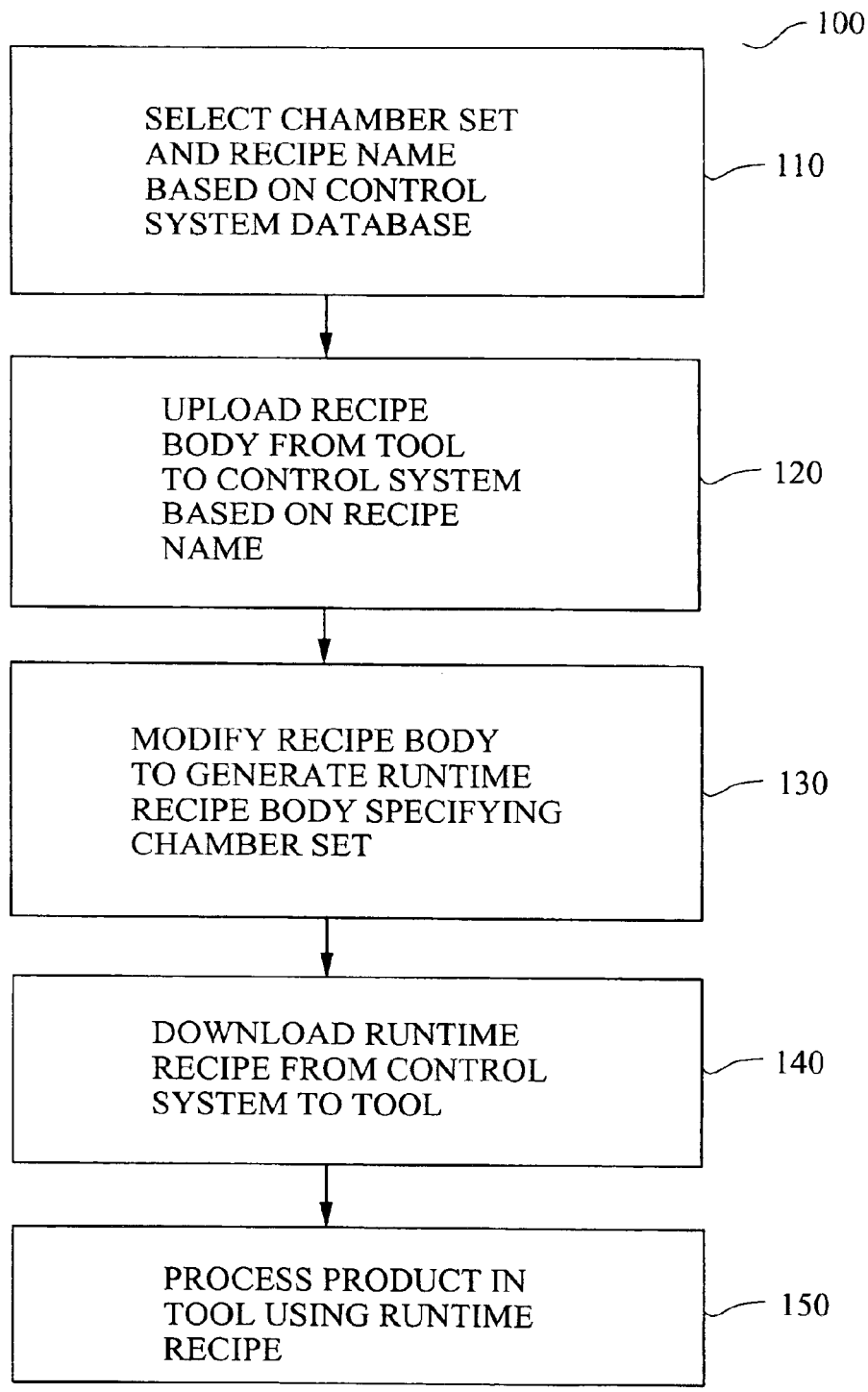
FIG. 3 illustrates a first preferred embodiment of the present invention.

Referring now to FIG. 3, the first preferred embodiment of the present invention is illustrated. Several important features of the present invention are shown and discussed below. The first preferred method 100 comprises, first, providing a control system and a process tool. Referring again to FIG. 2, the process tool 44 comprises multiple chambers 60, 64, 68, 72. Each chamber is preferably capable of processing product independently. Further, the process tool 44 stores a plurality of recipes in its recipe manager unit 52. Referring again to FIG. 1, the control system comprises a database 33 where lot tracking and product routing information is stored. Referring again to FIG. 3, as a first step in the first preferred method 100, a set of chambers and a recipe name are selected based on the database in step 110. Preferably, the lot number, or lot numbers, of the product are entered into the MES system, such as PROMIS™. The MES system references the tracking database to determine the next process step for that product lot. The recipe name is then retrieved from the routing database as an attribute. By entering, or moving in, the product lot into the MES system, the control system requests the available equipment status from the constraint server (CSN™). The constraint server returns the best available processing tool and, if applicable, the best available chamber or set of chambers on the tool.

Next, as an important feature of the present invention, a recipe body is uploaded from the process tool to the control system based on the recipe name in step 120. Since the actual recipe is stored on the process tool, it must be transferred from the tool to the equipment server (EQS™). Preferably, this transfer is performed using a SECS capatible interface between the equipment server and the tool as is known in the art. Alternatively, the transfer may be accomplished by other means, such as network links or serial links.

Once the recipe body is transferred to the control system, the recipe body is modified to generate a runtime recipe body that specifies the set of chambers in step 130. This is an important feature of the present invention. In the preferred embodiment, the process tool only stores a generic copy of the recipe. This generic copy is configured such that all of the chambers in the multiple chamber tool are set for processing. For example, if the tool comprises chambers A, B, C, and D, then the generic copy of the recipe is configured to allow processing in chambers A, B, C, and D, regardless of the current condition of the tool or any other constraints. This generic copy is read into the control system memory during the upload step. A modification procedure is then performed on the generic recipe body to change the chamber settings to those provided by the constraint server. For example, if the constraint server specifies that the product lot(s) be run on chamber B and C, then the modification procedure changes the generic chamber settings from "A, B, C, D" to "B, C". As will be discussed below in the example case, this modification is preferably performed by simply changing the value of a byte or of several bytes in the recipe sequence. The control system saves the modified recipe as a "runtime recipe."

Next, as an important feature of the present invention, the runtime recipe body is downloaded from the control system to the process tool in step 140. Once again, the preferred data transfer method is the SECS compatible link between the equipment server and the processing tool. As will be discussed in the second preferred embodiment, it may be useful to first download a new recipe name, called a runtime recipe name, to the tool prior to downloading the runtime recipe body. This approach has the advantage of always maintaining the original, generic recipe on the process tool while only altering a runtime copy. A product is then processed in the process tool using the runtime recipe body in step 150 to complete the method 100.

Figure 4:
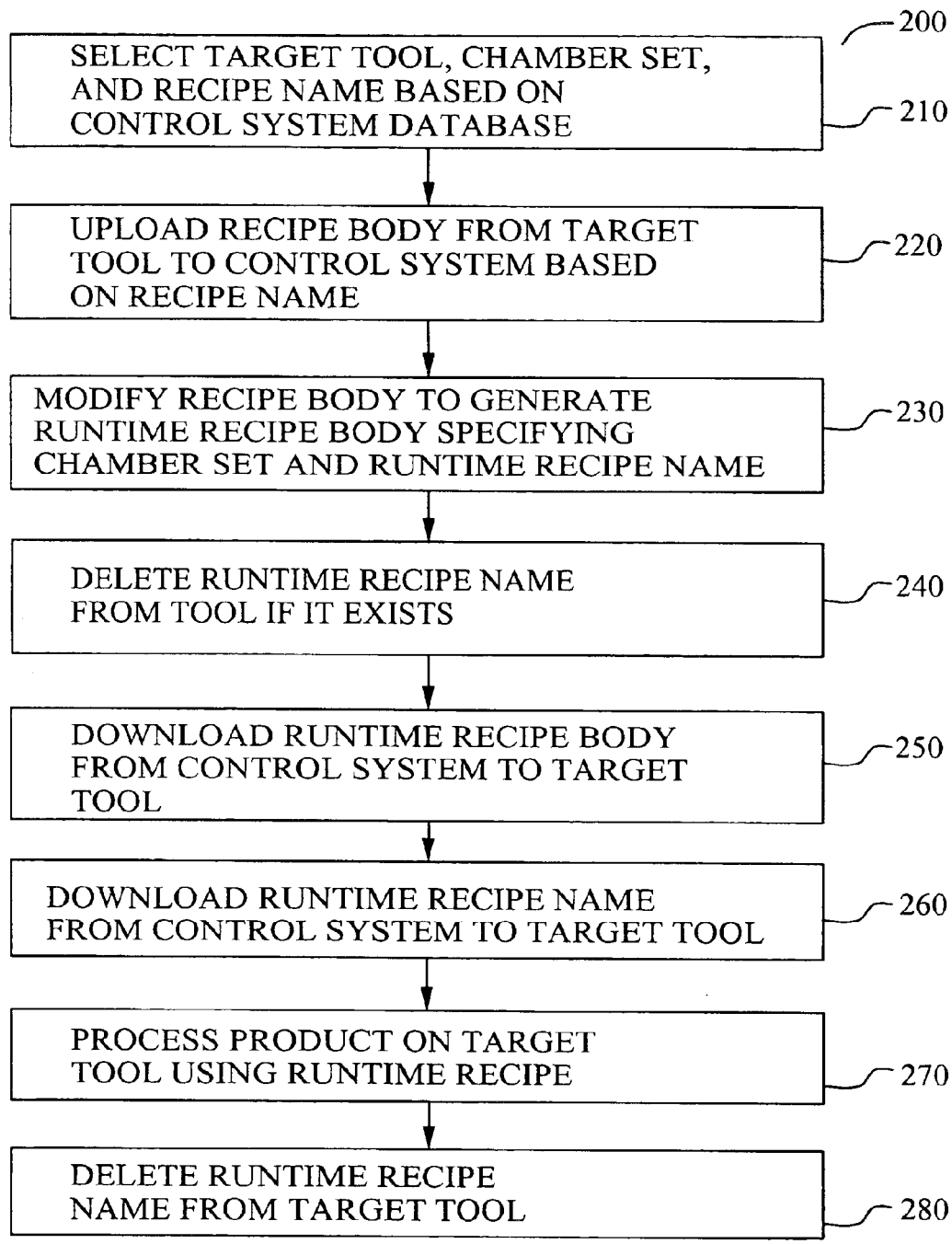
FIG. 4 illustrates a second preferred embodiment of the present invention.

Referring now to FIG. 4, a second preferred embodiment of the present invention is illustrated. This embodiment 200 presumes that a large number of tools are present in the manufacturing facility. In step 210, the target tool, the chamber set, and the recipe name are selected by the control system. Again, the product lot(s) is analyzed by the MES system to determine the next process step, equipment type, and recipe name. The constraint system then determines the optimum tool in the manufacturing line, herein called the target tool. Further, the constraint system determines the chamber set (one or more chambers) that will be used. The control system uploads the body of the recipe from the target tool based on the recipe name in step 220.

Preferably, only a generic form of the particular recipe is stored on the tool. In this way, the tool only stores the recipe variations that are significant to the process, such as different sequences of gas flows, different temperatures, or different pressures. Therefore, far fewer recipes need to be stored in the tool. This leads to several benefits. First, the process engineering effort required to maintain the recipes is reduced. Second, the likelihood of an error in the recipes, due to incorrect modification by the process engineer, is reduced. Third, additional space is created in the tool memory for additional, generic recipes.

As an important feature, the recipe body is modified to generate a runtime recipe body in step 230. The runtime recipe body specifies the chamber set and a runtime recipe name. Preferably, the modification is performed by altering data bytes in the recipe body. By altering the recipe name value that is included in the recipe body, the runtime recipe body can be referenced by the tool under the runtime recipe name. For example, if the generic recipe is "22LM11," then the generic recipe will contain a reference to "22LM11" in the data block defined as the PPID of the recipe. The tool may use this PPID data block within the body to identify the recipe and as a means of verifying the recipe. Therefore, the modification step 230 alters the PPID block with the runtime recipe. For example, the recipe name may be changed to "run22LM11".

Next, as an important feature, the runtime recipe name is deleted from the target tool in step 240. By deleting any reference to the runtime recipe name in the tool at this point, any chance of running an old copy of the runtime recipe is eliminated. Next, the runtime recipe is downloaded from the control system to the target tool in step 250. The runtime recipe name is then downloaded from the control system to the tool in step 260. At this point, the tool contains the generic recipe, referenced, for example, by PPID=22LM11, and the runtime recipe, referenced, for example, by PPID=run22LM11.

Next, the product is processed in the target tool using the runtime recipe in step 270. Preferably, the process start is commanded by the equipment server using the SECS interface. Finally, as an important feature, after processing of the product is complete, the runtime recipe name is deleted from the target tool by a command from the equipment server in step 280. This step prevents the running of the runtime version of the recipe on the target tool during some subsequent event. This prevents a processing error event and eliminates proliferation of recipes on the target tool.

Referring now to FIG. 5, an information flow and control diagram further illustrates the second preferred embodiment of the present invention. The diagram shows the actions of the run manager (RM), the equipment server (EQS), the SECS link, and the tool during the steps encompassed by the present invention. At step 1, the run manager issues a CheckAskLoad command to the equipment server. This command passes the target tool, the recipe name, and the chamber set to the EQS server. The EQS server issues a SECS standard command "S7F65" requesting an upload of the generic recipe name (PPID) from the target tool. The tool responds in step 3 with the "S7F66" response containing the generic PPID. EQS verifies that the generic PPID exists and then issues a SECS command "S7F5" to upload the body of the current PPID (PPBody). The tool responds with the "S7F6" response that includes a data stream with the body of the generic recipe.

The EQS now calls a function, ModifySEQBody, to modify the recipe body. ModifySEQBody first checks the recipe body to determine if it is a single chamber or a multiple chamber recipe. This classification will determine how particular byte values in the recipe body are changed. Next, the routine modifies particular bytes in the recipe sequence to designate the particular chamber or chambers that will be run. In the illustrated case, byte 35 is altered. After the recipe body is modified for the chamber set, the ModifySEQName function is called. This function will change the PPID name stored in the recipe body to the designated, runtime recipe name.

After the runtime recipe is modified, EQS commands the target tool to delete the runtime recipe name, PPID, using the "S7F67" command in step 6. The tool acknowledges this command with the "S7F68" response in step 8. Next, EQS asks the target tool to allow a recipe down load in the "S7F1/S7F2" sequence of steps 8 and 9. The runtime recipe body is then downloaded by the "S7F3/S7F4" sequence of steps 10 and 11. Finally, the runtime recipe name (PPID) is downloaded to the target tool in steps 12 and 13 using the command sequence "S7F11/S7F12".

At this point, the CheckAskLoad command is complete, and a return value is sent to the run manager in step 14. The standard run verification sequence is then performed to run the product in the tool chambers. Following the product run, the run manager issues the CheckEndUnload command in step 15. At this point, EQS commands the target tool to delete the runtime PPID via the "S7F67/S7F68" sequence in steps 16 and 17. Finally, EQS issues an acknowledgment to the run manager in step 18.

The above described scenario is further illustrated by examining a part of the recipe sequence for a dry etcher used in integrated circuit processing. Referring now to Table 1, a position of the recipe sequence body is shown.

TABLE 1

Partial listing of a recipe sequence for a dry etcher

| Level | Item Name | Value |
|---|---|---|
| 1 | Name | 25E3M403* |
| 2 | StepCount | 6 |
| 3 | Reclen | 44 |
| 4 | Frozen | 1 |
| 5 | Waferin | 0 |
| 6 | ExchangeMode | 0 |
| 7 | Spare | 0 |
| 8 | LoadlockBase | 0 |
| 9 | Reserve | 0 |
| 10 | Spare | |
| 11 | Title | 0.25NEW |
| 12 | CreateDateSec | 7 |
| 13 | CreateDateMin | 5 |
| 14 | CreateDateHr | 10 |
| 15 | CreateDateDay | 10 |
| 16 | CreateDateMon | 10 |
| 17 | CreateDateYr | 1 |
| 18 | Creator | EE |
| 19 | Modifier | EE |
| 20 | Spare | |
| 21 | Port | 19 |
| 22 | Number | 1 |
| 23 | WaferClean | |
| 24 | Recipe | 25E3M403* |
| 25 | Delay | 3 |
| 26 | Unit | 47 |
| 27 | DispFlag | 0 |
| 28 | Attrib | 21 |
| 29 | Spare | 0 |
| 30 | ChamberMask | 6* |
| 31 | Port | 19 |
| 32 | Number | 2 |
| 33 | WaferClean | |
| 34 | Recipe | STRIP-1* |
| 35 | Delay | 12 |
| 36 | Unit | 47 |
| 37 | DispFlag | 0 |
| 38 | Attrib | 21 |
| 39 | Spare | 0 |
| 40 | ChamberMask | 24* |

(*= item modified by equipment server routine)

Each item number represents a byte or several bytes of data as determined by the standard, recipe body structure for the dry etcher. Several items should be noted. The main recipe name, "25E3M403" is included as item 1. This name block is changed by the EQS system from the generic name to the runtime name during the recipe modification.

Two process blocks are shown in the sequence. One block comprises items 21–30. Another block comprises items 31–40. Each process block has a recipe name, such as "25E3M403" and "STRIP-1". These recipe names are also changed by the modification function in EQS. Each process block also contains a ChamberMask as the last item (30 and 40). The ChamberMask determines the particular chambers that will be run. The ChamberMask blocks (items 30 and 40) are modified by the EQS function to select the appropriate chambers based on the chamber encoding scheme used by the ChamberMask blocks.

The present invention has been applied to an integrated circuit manufacturing facility. A comparison of this facility with a similar facility that uses the prior art technique for managing recipes for multiple chamber tools demonstrates impressive results as shown in Table 2.

TABLE 2

Comparison of Invention to Prior Art.

| Item | Fab (New Way) | Fab (Old Way) |
|---|---|---|
| Ave. # sequences/tech/node/tool | 11 | 6 |
| Ave. # chamber combinations/tool | 1 | 10 |
| Total # sequences/tool/node | 11 | 60 |
| Ave. maintenance/tool/node/month | 10 min. | 10 min. |
| Total maintenance/tool/node/month | 110 min. | 600 min. |
| # technology nodes/tool | 3 | 3 |
| Total maintenance/tool/month | 330 min. | 1800 min. |
| # multi-chamber tools | 111 | 112 |
| Total maintenance/month | 610 hr. | 3360 hr. |
| Manpower required at 42 hr/week | 3.8 mos. | 20 mos. |

The advantages of the present invention may now be summarized. An effective and very manufacturable method to manufacture a product is achieved. The method dynamically formulates processing recipes for multiple chamber process tools. The method eliminates recipe proliferation by dynamically modifying recipes to include chamber selection information. The method eliminates errors caused by recipe proliferation. The method reduces process engineering workload due to recipe proliferation. An apparatus to manufacture a product where recipe proliferation is eliminated by dynamically modifying recipe sequences to include chamber selection is achieved.

As shown in the preferred embodiments, the novel method of the present invention provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method to manufacture a product, said method comprising:

providing a control system and a process tool wherein said process tool comprises multiple chambers, wherein said process tool stores a plurality of recipes, and wherein said control system comprises a database;

selecting a set of said chambers and a recipe name based on said database;

uploading a recipe body from said process tool to said control system based on said recipe name;

modifying said recipe body to generate a runtime recipe body that specifies said set of chambers;

downloading said runtime recipe body from said control system to said process tool; and processing a product in said process tool using said runtime recipe body.

2. The method according to claim 1 further comprising:
modifying said runtime recipe body to specify a runtime recipe name prior to said step of downloading said runtime recipe body to said process tool; and
downloading said runtime recipe name from said control system to said process tool prior to said step of processing a product in said process tool.

3. The method according to claim 2 further comprising deleting said runtime recipe name from said process tool prior to said step of downloading said runtime recipe body from said control system to said process tool.

4. The method according to claim 2 further comprising deleting said runtime recipe name from said process tool after said step of processing a product in said process tool.

5. The method according to claim 1 wherein said recipe body and said runtime recipe body are transferred between said control system and said process tool by a SECS compatible interface.

6. The method according to claim 1 wherein said product comprises an integrated circuit device.

7. The method according to claim 1 wherein said step of selecting a set of said chambers and a recipe name is further based on a lot number.

8. The method according to claim 7 wherein said step of processing a product in said process tool using said runtime recipe body comprises multiple said lot numbers.

9. The method according to claim 1 wherein said step of modifying said recipe body comprises altering values of individual data bytes.

10. A method to manufacture a product, said method comprising:
providing a control system and a plurality of process tools wherein said process tools comprise multiple chambers, wherein said process tools store a plurality of recipes, and wherein said control system comprises a database;
selecting a target process tool, a set of said chambers and a recipe name based on said database;
uploading a recipe body from said target process tool to said control system based on said recipe name;
modifying said recipe body to generate a runtime recipe body that specifies said set of chambers and that specifies a runtime recipe name;
deleting said runtime recipe name from said target process tool if it exists;
downloading said runtime recipe name from said control system to said target process tool;
processing a product in said target process tool using said runtime recipe body; and
deleting said runtime recipe name from said target process tool.

11. The method according to claim 10 further comprising downloading said runtime recipe body from said control system to said target process tool prior to said step of downloading said runtime recipe name from said control system to said target process tool.

12. The method according to claim 10 wherein said recipe body and said runtime recipe body are transferred between said control system and said target process tool by a SECS compatible interface.

13. The method according to claim 10 wherein said product comprises an integrated circuit device.

14. The method according to claim 10 wherein said step of selecting a target process tool, a set of said chambers and a recipe name based on said database is further based on a lot number.

15. The method according to claim 14 wherein said step of processing a product in said target process tool using said runtime recipe body comprises multiple said lot numbers.

16. The method according to claim 10 wherein said step of modifying said recipe body comprises altering values of individual data bytes.

17. An apparatus to manufacture a product, said apparatus comprising:
a process tool wherein said process tool comprises multiple chambers and wherein said process tool stores a plurality of recipes; and
a control system wherein said control system comprises a database and wherein said control system governs tasks comprising:
selecting a set of chambers and a recipe name based on a database stored in said control system;
uploading a recipe body from said process tool to said control system based on said recipe name;
modifying said recipe body to generate a runtime recipe body that specifies said set of chambers;
downloading said runtime recipe body from said control system to said process tool; and
processing a product in said process tool using said runtime recipe body.

18. The apparatus according to claim 17 wherein said tasks further comprise:
modifying said runtime recipe body to specify a runtime recipe name; and
downloading said runtime recipe name from said control system to said process tool.

19. The apparatus according to claim 18 wherein said tasks further comprise deleting said runtime recipe name from said process tool.

20. The apparatus according to claim 17 wherein said tasks further comprise verifying said recipe body against said database.

21. The apparatus according to claim 17 further comprising a SECS compatible interface between said control system and said process tool by.

22. The apparatus according to claim 17 wherein said product comprises an integrated circuit device.

23. The apparatus according to claim 17 wherein said task of selecting a set of said chambers and a recipe name based on said database is further based on a lot number.

24. The apparatus according to claim 23 wherein said task of processing a product in said process tool using said runtime recipe body comprises multiple said lot numbers.

25. The apparatus according to claim 17 wherein said task of modifying said recipe body comprises altering values of individual data bytes.

* * * * *